United States Patent
Chen et al.

(10) Patent No.: US 12,366,928 B2
(45) Date of Patent: Jul. 22, 2025

(54) INPUT METHOD AND CONTROLLER OF TOUCH KEYBOARD

(71) Applicant: PIXART IMAGING INC., Hsin-Chu (TW)

(72) Inventors: Yu-Han Chen, Hsin-Chu (TW); Tse-Chung Su, Hsin-Chu (TW); Sung-Han Wu, Hsin-Chu (TW); Xiao-Lin Chuang, Hsin-Chu (TW); Chi-Chieh Liao, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 148 days.

(21) Appl. No.: 17/945,204

(22) Filed: Sep. 15, 2022

(65) Prior Publication Data
US 2023/0333667 A1    Oct. 19, 2023

(30) Foreign Application Priority Data
Apr. 19, 2022  (CN) .......................... 202210409118.4

(51) Int. Cl.
*G06F 3/023* (2006.01)
(52) U.S. Cl.
CPC .................................. *G06F 3/023* (2013.01)

(58) Field of Classification Search
CPC .... G06F 3/0213; G06F 3/023; G06F 3/03547; G06F 3/04883; G06F 3/04886
See application file for complete search history.

(56) References Cited

U.S. PATENT DOCUMENTS

| 6,204,839 | B1 * | 3/2001 | Mato, Jr. | H03K 17/975 345/157 |
| 6,288,707 | B1 * | 9/2001 | Philipp | G06F 3/0443 345/173 |
| 2013/0135211 | A1 * | 5/2013 | Chiang | G06F 3/0446 345/168 |
| 2014/0267043 | A1 * | 9/2014 | Kaiser | G06F 3/044 345/168 |
| 2018/0218859 | A1 * | 8/2018 | Ligtenberg | H10N 30/20 |
| 2022/0294444 | A1 * | 9/2022 | Liu | G06F 1/1662 |

* cited by examiner

*Primary Examiner* — Ryan A Lubit
(74) *Attorney, Agent, or Firm* — Li & Cai Intellectual Property (USA) Office (57) ABSTRACT

An input method and a controller of a touch keyboard are provided. The input method includes: detecting a touch behavior performed on the touch keyboard, and identifying the touch behavior to determine whether to output mouse event data, keyboard event data or a combination of mouse event data and keyboard event data.

12 Claims, 9 Drawing Sheets

FIG. 9

INPUT METHOD AND CONTROLLER OF TOUCH KEYBOARD

CROSS-REFERENCE TO RELATED PATENT APPLICATION

This application claims the benefit of priority to China Patent Application No. 202210409118.4, filed on Apr. 19, 2022 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an input method and a controller, and more particularly, to an input method and a controller of a touch keyboard.

BACKGROUND OF THE DISCLOSURE

Compared with the conventional keyboard, a touch keyboard integrates a touch panel into a keyboard, such that the keyboard can be provided with touch functions. For example, a user can control cursor movement by sliding a finger across a surface of the keyboard. Therefore, an input method and a controller of the touch keyboard are designed to be switchable between a touch panel mode and a keyboard mode. However, if the touch keyboard is designed with modes that need to be manually switched by the user, an additional mode switching action is required. Further, if the touch keyboard is designed to automatically detect the mode under which the user is operating, misrecognition can often occur. In addition, in order to support gesture operation, the existing controller of the touch keyboard only outputs absolute coordinates of a touch object in the touch panel mode, and an operating system (OS) of an electronic computer detects a gesture according to the absolute coordinates of the touch object. Therefore, it is difficult to effectively filter incidents involving accidental touching of the touch keyboard.

SUMMARY OF THE DISCLOSURE

In response to the above-referenced technical inadequacies, the present disclosure provides an input method and a controller of a touch keyboard that can effectively filter mistouching actions of a user when using the touch keyboard.

In one aspect, the present disclosure provides an input method for a touch keyboard, including: detecting a touch behavior performed on the touch keyboard; and identifying the touch behavior to determine whether to output mouse event data, keyboard event data or a combination of mouse event data and keyboard event data.

In some embodiments, the step of identifying the touch behavior includes: detecting at least one touch object that performs the touch behavior, and calculating at least one touch position of the at least one touch object; and analyzing, according to the at least one touch position, at least one sensed amount change of the at least one touch object, so as to identify the touch behavior.

In some embodiments, the at least one sensed amount change is at least one touch position change of the at least one touch object, or a sensed amount change at a single touch position.

In some embodiments, the step of identifying the touch behavior includes: detecting a first touch object and a second touch object that perform the touch behavior, and calculating a first touch position of the first touch object and a second touch position of the second touch object; analyzing a first path of the first touch object and a second path of the second touch object according to the first touch position and the second touch position; and identifying the touch behavior according to a relative movement relationship between the first path and the second path.

In some embodiments, the step of identifying the touch behavior includes: detecting a first touch object and a second touch object that perform the touch behavior, and calculating a first touch position of the first touch object and a second touch position of the second touch object; and in response to the first touch position being the same as the second touch position, analyzing a time interval between the first touch object and the second touch object, and identifying the touch behavior according to the time interval.

In some embodiments, the input method further includes: generating, according to the identified touch behavior, the mouse event data, the keyboard event data, or the combination of the mouse event data and the keyboard event data, which is then output to an operating system of an electronic computer.

In another aspect, the present disclosure provides a controller for a touch keyboard, and the controller includes a detection circuit and a control circuit. The detection circuit is configured to detect a touch behavior performed on the touch keyboard. The control circuit is configured to identify the touch behavior to determine whether to output mouse event data, keyboard event data or a combination of mouse event data and keyboard event data.

In some embodiments, the control circuit includes an object detection module and a gesture detection module. The object detection module is configured to detect at least one touch object that performs the touch behavior, and calculate at least one touch position of the at least one touch object. The gesture detection module is configured to analyze, according to the at least one touch position, at least one sensed amount change of the at least one touch object, so as to identify the touch behavior.

In some embodiments, the at least one sensed amount change is at least one touch position change of the at least one touch object, or a sensed amount change at a single touch position.

In some embodiments, the control circuit includes an object detection module and a gesture detection module. The object detection module is configured to detect a first touch object and a second touch object that perform the touch behavior, and calculate a first touch position of the first touch object and a second touch position of the second touch object. The gesture detection module is configured to analyze a first path of the first touch object and a second path of the second touch object according to the first touch position and the second touch position, and to identify the touch behavior according to a relative movement relationship between the first path and the second path.

In some embodiments, the control circuit includes an object detection module and a gesture detection module. The object detection module is configured to detect a first touch object and a second touch object that perform the touch behavior, and calculate a first touch position of the first touch object and a second touch position of the second touch object. The gesture detection module is configured to analyze, in response to the first touch position being the same as the second touch position, a time interval between the first touch object and the second touch object, and identifying the touch behavior according to the time interval.

In some embodiments, the control circuit further includes a data generating module configured to generate, according to the identified touch behavior, the mouse event data, the keyboard event data, or the combination of the mouse event data and the keyboard event data, which is then output to an operating system of an electronic computer.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
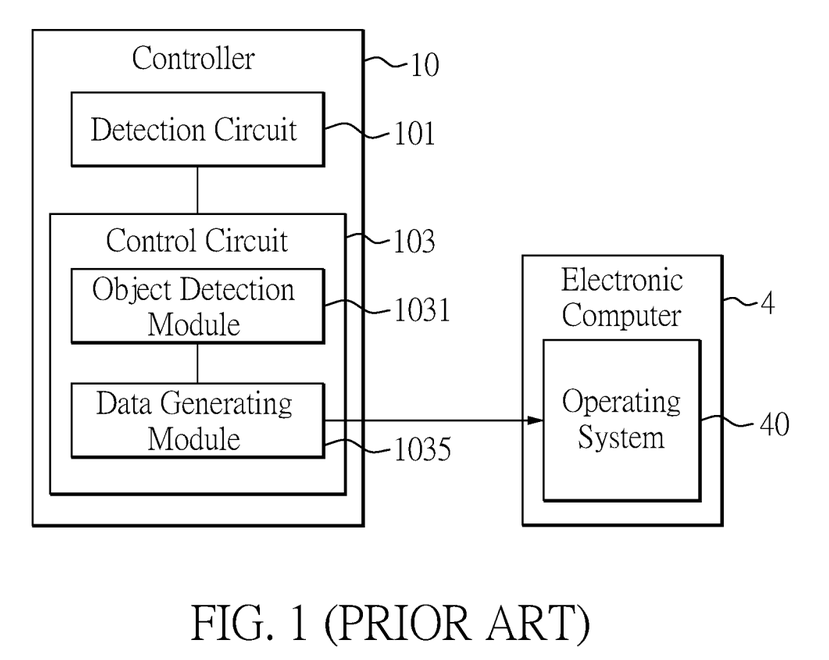
FIG. 1 is a functional block diagram of the existing controller of a touch keyboard.

Reference is made to FIG. 1, which is a functional block diagram of the existing controller of a touch keyboard. As shown in FIG. 1, the existing controller 10 includes a detection circuit 101 and a control circuit 103. The detection circuit 101 is used to detect a touch behavior performed on the touch keyboard. The control circuit 103 includes an object detection module 1031 and a data generating module 1035. The object detection module 1031 is used to detect at least one touch object that performs the touch behavior, and to calculate at least one touch position of the at least one touch object.

The touch behavior can be performed by using a conductor to directly contact or approach the touch keyboard, or by using a non-conductor to press a conductive button to cause changes in sensing signals of the detection circuit 101.

The data generating module 1035 is used to generate precise touchpad data with absolute coordinates of the touch object according to the at least one touch position of the at least one touch object, and output the touchpad data to an operating system 40 of an electronic computer 4. In addition, the operating system 40 of the electronic computer 4 detects a gesture according to the absolute coordinates of the touch object, and performs an action corresponding to the gesture. The operating system 40 in the embodiment of the present disclosure takes Microsoft Windows® 10 (by Microsoft Corporation, headquartered in the U.S.A.) as an example.

Figure 2:
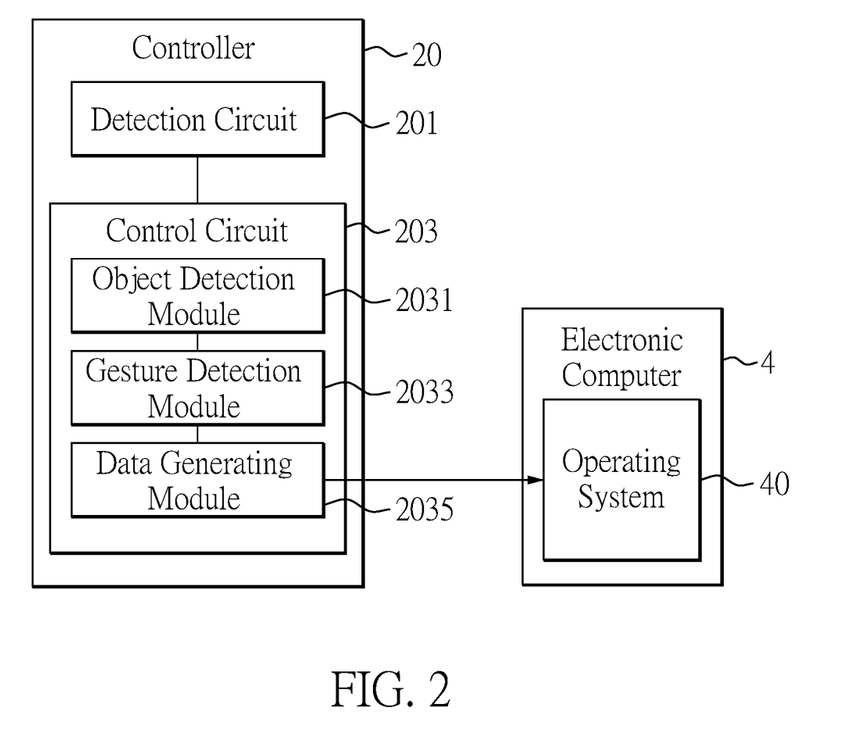
FIG. 2 is a functional block diagram of a controller of a touch keyboard according to one embodiment of the present disclosure.

In contrast, referring to FIG. 2, FIG. 2 is a functional block diagram of a controller of a touch keyboard according to one embodiment of the present disclosure. As shown in FIG. 2, a controller 20 of the embodiment of the present disclosure includes a detection circuit 201 and a control circuit 203. The detection circuit 201 and the control circuit 203 can be implemented by hardware (e.g., a processor and a memory) combined with software and/or firmware, but the present disclosure does not limit specific implementations of the detection circuit 201 and the control circuit 203. In addition, the detection circuit 201 and the control circuit 203 can be integrated or separately provided, but the present disclosure is not limited thereto.

Figure 3:
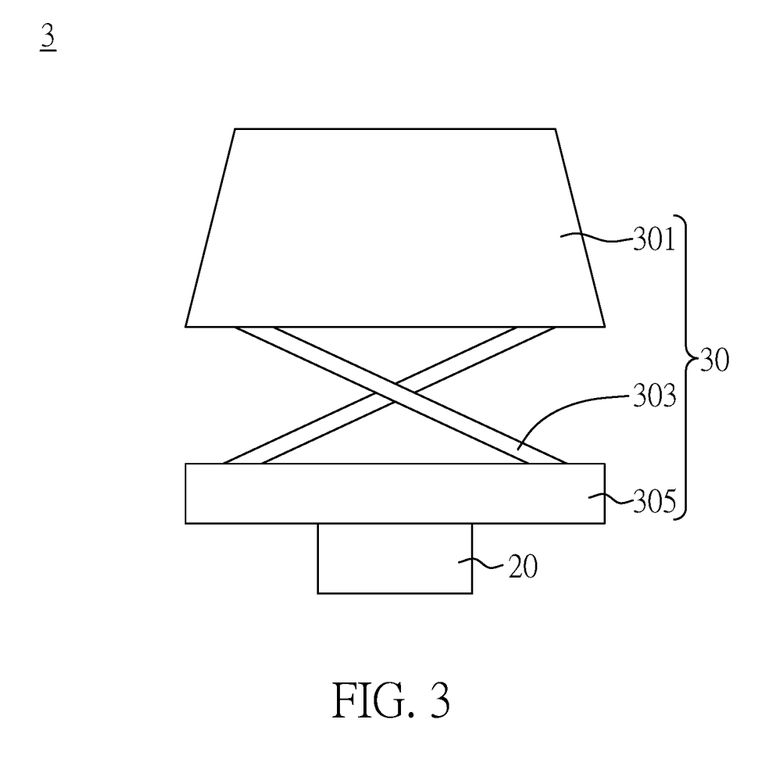
FIG. 3 is a schematic diagram of a touch keyboard according to one embodiment of the present disclosure.
Figure 4:
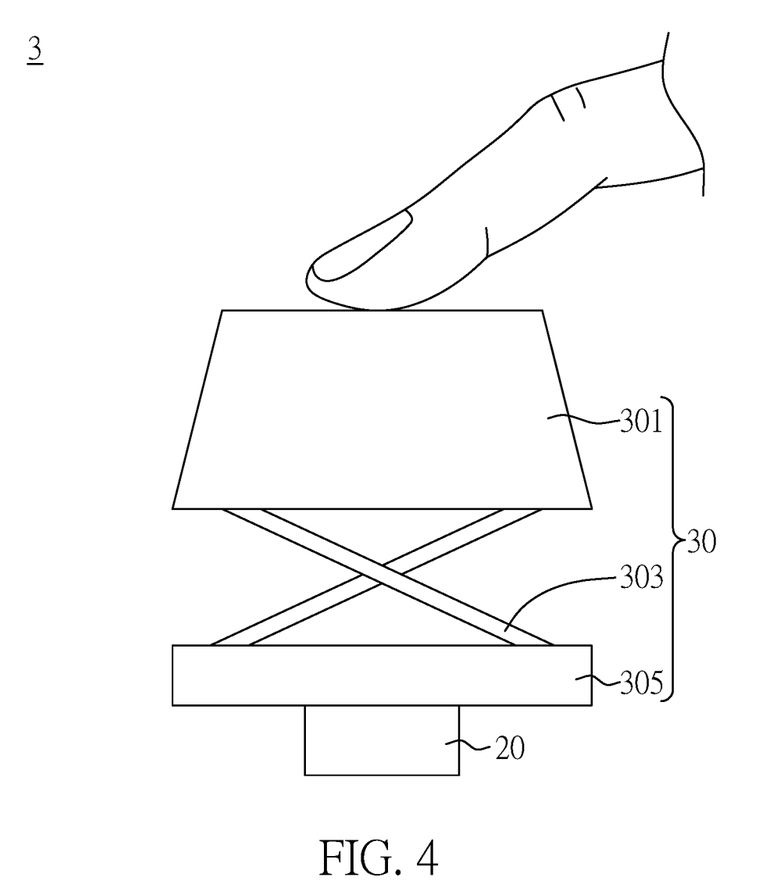
FIG. 4 is a schematic diagram showing a keycap of a key unit of the touch keyboard of FIG. 3 being touched.
Figure 5:
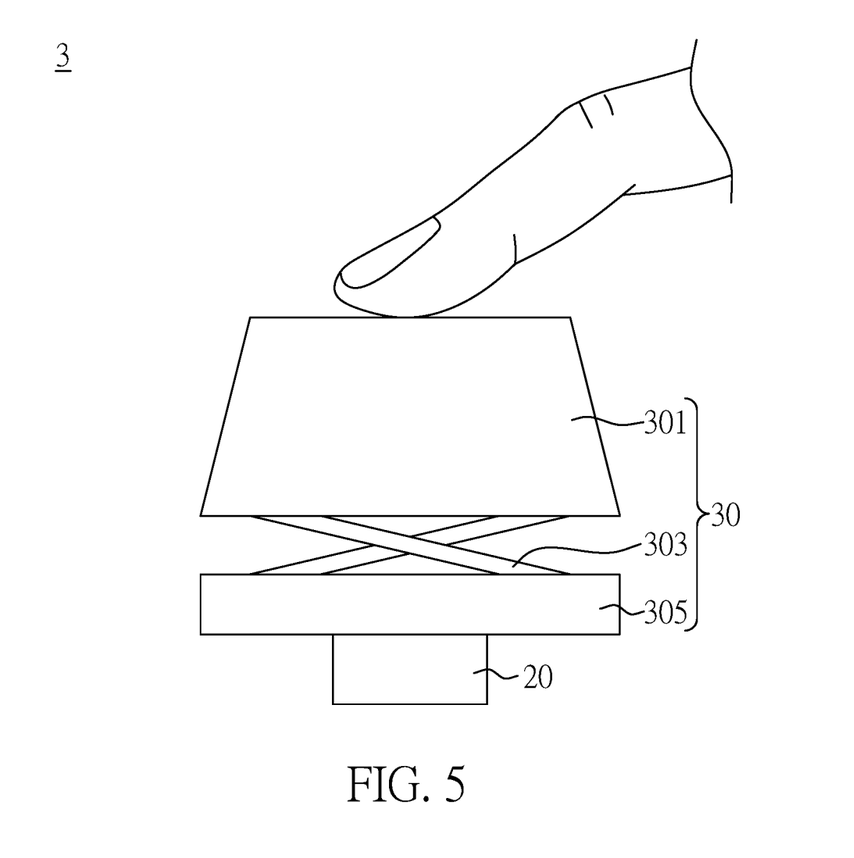
FIG. 5 is a schematic diagram showing a keycap of a key unit of the touch keyboard of FIG. 3 being pressed.

The detection circuit 201 is configured to detect a touch behavior performed on the touch keyboard. The control circuit 203 is connected to the detection circuit 201 for identifying the touch behavior, so as to determine whether to output mouse event data, keyboard event data or a combination of mouse event data and keyboard event data. Reference is made to FIGS. 3 to 5. FIG. 3 is a schematic diagram of a touch keyboard according to an embodiment of the present disclosure, FIG. 4 is a schematic diagram showing that a keycap of a key unit of the touch keyboard of FIG. 3 is touched, and FIG. 5 is a schematic diagram showing that a keycap of a key unit of the touch keyboard of FIG. 3 is pressed.

As shown in FIGS. 3 to 5, the touch keyboard 3 can include at least one key unit 30. The key unit 30 includes a keycap 301, an elastic element 303 and a capacitance sensor 305. The elastic element 303 is disposed between the keycap 301 and the capacitive sensor 305, such that the keycap 301 can be moved relative to the capacitive sensor 305 between an unpressed position and a pressed position. The controller 20 is connected to the capacitance sensor 305 to obtain a sensed capacitance value of the capacitance sensor 305, and determine whether the keycap 301 is touched or pressed according to a change of the sensed capacitance value.

In the present embodiment, when the change of the sensed capacitance value is greater than a first threshold and less than a second threshold, the controller 20 can determine that the keycap 301 is touched, and the detection circuit 201 of the controller 20 detects the touch behavior performed on this touch keyboard. In addition, when the change of the sensed capacitance value is greater than the second threshold, the controller 20 determines that the keycap 301 is pressed. However, the present disclosure does not limit specific implementations of the touch keyboard 3 and the controller 20 for determining whether the keycap 301 is touched or pressed.

In other embodiments, the controller 20 can further determine whether the keycap 301 is touched or pressed according to a duration of the change of the sensed capacitance value. For example, when the keycap 301 is pressed, the duration of the change in the sensed capacitance value should be longer, and when the keycap 301 is touched, the duration of the change in the sensed capacitance value should be relatively shorter. In addition, the sensed capacitance value of the capacitance sensor 305 can be converted into a sensed pressure value, or the capacitance sensor 305 can be replaced by a pressure sensor that generates the sensed pressure value, such that the controller 20 can obtain the sensed pressure value and determine whether the keycap 301 is touched or pressed according to the sensed pressure value. For example, the controller 20 can obtain a larger sensed pressure value when the keycap 301 is pressed, and can obtain a smaller sensed pressure value when the keycap 301 is touched.

Furthermore, the key unit 30 can further include a scan line layer disposed under the elastic element 303. In response to the keycap 301 being pressed, the scan line layer generates a short-circuit signal, such that the controller 20 can determine that the keycap 301 is pressed in response to receiving the short-circuit signal. Therefore, the present disclosure does not focus on determining whether the keycap 301 is pressed or touched, in other words, the present disclosure does not focus on determining whether a touch behavior or a key press behavior is performed on the touch keyboard 3, but focus on enabling the touch keyboard 3 to directly identify the touch behavior and output data different from the precise touch panel data to the operating system 40 of the electronic computer 4.

Specifically, the present embodiment can at least include the following touch behaviors: (1) single tapping or double tapping one finger on the touch keyboard 3 to select or execute an item; (2) placing two fingers on the touch keyboard 3 and swiping vertically to scroll a scroll bar; (3) placing two fingers on the touch keyboard 3 and pinching inward or stretch outward to zoom in or out; (4) tapping two fingers on the touch keyboard 3 to pop up a menu; (5) placing three fingers on the touch keyboard 3 and swiping upward to pop up a multitasking interface; (6) placing three fingers on the touch keyboard 3 and swiping downward to display a desktop; (7) placing three fingers on the touch keyboard 3 and swiping left or right to switch between open windows; (8) tapping three fingers on the touch keyboard 3 to open a search box; and (9) tapping four fingers on the touch keyboard 3 to open a control center.

Taking the action of selecting the item as an example, this action can also be implemented by the user clicking a left mouse button. Therefore, when the control circuit 203 identifies that the touch behavior is single tapping one finger and an item is to be selected, the control circuit 203 can determine to output mouse event data for clicking the left mouse button. Taking the action of executing an item as an example, this action can also be implemented by the user double-clicking the left mouse button. Therefore, when the control circuit 203 identifies that the touch behavior is double tapping one finger and an item is to be executed, the control circuit 203 can determine to output mouse event data for double-clicking the left mouse button.

Taking the action of scrolling a scroll bar as an example, this action can also be implemented by the user to scroll a mouse wheel. Therefore, when the control circuit 203 identifies that the touch behavior is placing down and vertically swiping two fingers and a scroll bar is to be selected, the control circuit 203 can determine to output mouse event data for scrolling the mouse wheel. In addition, taking the action of zooming out or in as an example, this action can also be realized by the user pressing the Ctrl key on a keyboard and scrolling the mouse wheel. Therefore, when the control circuit 203 identifies that the touch behavior is placing down two fingers and pinching together or stretching apart the two fingers for zooming in or out, the control circuit 203 can determine to output a combination of keyboard event data of pressing the Ctrl key and mouse event data of scrolling the mouse wheel.

Taking the action of popping up a menu as an example, this action can be realized by the user to click a right mouse button. Therefore, when the control circuit 203 identifies that the touch behavior is tapping two fingers and a menu is to be popped up, the control circuit 203 can determine to output mouse event data of clicking the right mouse button. In addition, taking the action of popping up the multitasking interface as an example, this action can also be realized by the user to press Windows key and Tab key of the keyboard. Therefore, when the control circuit 203 identifies that the touch behavior is swiping up three fingers and the multitasking interface is to be popped up, the control circuit 203 can determine to output keyboard event data of simultaneously pressing Windows key and Tab key of the keyboard.

Taking the action of displaying the desktop as an example, this action can also be realized by the user to simultaneously press Windows key and M key of the keyboard. Therefore, when the control circuit 203 identifies that the touch behavior is sliding down three fingers and the desktop is to be displayed, the control circuit 203 can determine to output keyboard event data of simultaneously pressing Windows key and M key. In addition, if taking the action of quickly switching between open windows as an example, this action can also be realized by the user to simultaneously press Alt key, Tab key, and left or right key of the keyboard. Therefore, when the control circuit 203 identifies that the touch behavior is swiping three fingers left or right for quickly switching between the open windows, the control circuit 203 can determine to output keyboard event data of simultaneously pressing Alt key, Tab key, and left or right key.

Taking the action of opening the search box as an example, this action can also be realized by the user to simultaneously press Windows key and S key of the keyboard. Therefore, when the control circuit 203 identifies that the touch behavior is tapping three fingers and the search box is to be opened, the control circuit 203 can determine to output keyboard event data of simultaneously pressing Windows key and S key. In addition, taking the action of opening the action center as an example, this action can also be realized by the user to simultaneously press Windows key and A key of the keyboard. Therefore, when the control circuit 203 identifies that the touch behavior is tapping four fingers and the action center is to be opened, the control circuit 203 can determine to output keyboard event data of simultaneously pressing Windows key and A key.

In more detail, the touch behavior is used to define a gesture and an action corresponding to the gesture, so that a gesture can be detected by identifying the touch behavior. As shown in FIG. 2, the control circuit 203 can include an object detection module 2031, a gesture detection module 2033 and a data generating module 2035. In the present embodiment, the object detection module 2031 is configured to detect at least one touch object that performs a touch behavior, and calculate at least one touch position of the at least one touch object. The gesture detection module 2033 is configured to analyze, according to the at least one touch position, at least one sensed amount change of the at least one touch object, so as to identify the touch behavior. In addition, the data generating module 2035 is configured to generate, according to the identified touch behavior, the mouse event data, the keyboard event data, or the combination of the mouse event data and the keyboard event data, which is then output to the operating system 40 of the electronic computer 4.

It should be noted that the at least one sensed amount change is at least one touch position change (i.e., path) of the at least one touch object, or a sensed amount change at a single touch position. As described above, in response to the keycap 301 being touched, the sensed capacitance value of the capacitance sensor 305 changes. Therefore, taking the action of tapping one finger to select an item as an example, the object detection module 2031 can detect a finger that performs the touch behavior, and calculate a touch position of the finger. Then, the gesture detection module 2033 can analyze, according to the touch position, a sensed amount change at a single touch position of the finger, so as to identify the touch behavior and detect that the gesture is tapping one finger. In addition, the data generating module 2035 is configured to generate the mouse event data of clicking the left mouse button according to the recognized touch behavior, so as to output the mouse event data of clicking the left mouse button to the operating system 40 of the electronic computer 4. That is to say, the generated mouse event data, the keyboard event data, or the combination of the mouse event data and the keyboard event data should be able to instruct the operating system 40 of the electronic computer 4 to perform the action corresponding to the gesture.

On the other hand, if the identified touch behavior is a false touch when the user uses the touch keyboard, the data generation module 2035 may not need to generate the mouse event data, the keyboard event data, or the combination of the mouse event data and the keyboard event data that is output to the operating system 40 of the electronic computer 4. More precisely, when the control circuit 203 identifies that the touch behavior is the false touch action, the control circuit 203 can determine not to output any data to the operating system 40 of the electronic computer 4, so as to effectively filter the any accidental touching of the touch keyboard.

In addition, in order to support gesture operation, the existing controller 10 merely outputs precise touchpad data with absolute coordinates of a touch object, and then the operating system 40 of the electronic computer 4 detects a gesture according to the absolute coordinates of the touch object. Therefore, it is difficult to effectively filter any accidental touching of the touch keyboard. In contrast, the controller 20 provided by the present disclosure can directly identify the touch behavior, and does not need to send the absolute coordinates of the touch object to the operating system 40 of next stage to detect gestures; that is, a detection process of a gesture is under completely control, thereby effectively filtering any accidental touching actions when using the touch keyboard. Moreover, the operating system 40 of the electronic computer 4 can also perform the action corresponding to the gesture more quickly after receiving the mouse event data, the keyboard event data or the combination of the mouse event data and the keyboard event data mentioned above.

In addition, taking the action of placing down and pinching in or stretching out two fingers to zoom in or out as an example, the object detection module 2031 can be configured to detect a first touch object and a second touch object (i.e., first and second fingers) that perform the touch behavior, and to calculate a first touch position of the first touch object and a second touch position of the second touch object. The gesture detection module 2033 can be configured to analyze a first path of the first touch object and a second path of the second touch object according to the first touch position and the second touch position, and to identify the touch behavior according to a relative movement relationship between the first path and the second path.

For example, if the relative movement relationship between the first path and the second path is that the first and second touch objects approach each other, the gesture detection module 2033 can identify that the touch behavior is pinching in two fingers for zooming out, that is, the gesture is detected as placing down and pinching in two fingers. Otherwise, if the relative movement relationship between the first track and the second track is that the first and second touch objects are moved away from each other, the gesture detection module 2033 can identify the touch behavior as two fingers moving apart for zooming in, that is, the gesture is detected as placing down and stretching out two fingers. However, for the touch behavior of scrolling the scroll bar by sliding up or down with two fingers, and the touch behavior of quickly switching between open windows by sliding left or right with three fingers, those skilled in the art can understand specific operations of the object detection module 2031 and the gesture detection module 2033 from the above description, so that details thereof are omitted hereinafter.

In addition, taking double tapping one finger to execute an item as an example, the object detection module 2031 can be configured to detect a first touch object and a second touch object that perform the touch behavior, and calculate a first touch position of the first touch object and a second touch position of the second touch object. At this time, the first touch object and the second touch object can be the same finger, but the present disclosure is not limited thereto. In brief, in response to the first touch position being the same as the second touch position, the gesture detection module 2033 can analyze a time interval between the first touch object and the second touch object, and identify a touch behavior according to the time interval.

For example, if the time interval is less than a predetermined time interval, the gesture detection module 2033 can identify that the touch behavior is double tapping one finger for executing an item, that is, the gesture is detected as double tapping one finger. In addition, for the touch behavior of tapping three fingers to open the search box, and the touch behavior of tapping four fingers to open the action center, those skilled in the art can understand specific operations of the object detection module 2031 and the gesture detection module 2033 from the above descriptions, so that details thereof are omitted hereinafter.

Figure 6:
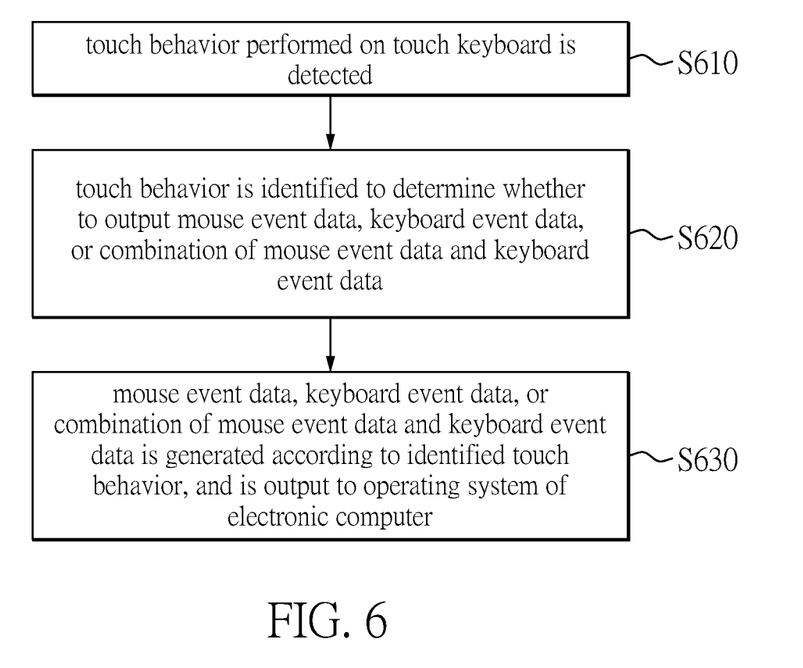
FIG. 6 is a flowchart of an input method of a touch keyboard according to one embodiment of the present disclosure.

On the other hand, reference is made to FIG. 6, which is a flowchart of an input method of a touch keyboard according to one embodiment of the present disclosure. In FIG. 6, one embodiment of the present disclosure provides an input method for a touch keyboard, including steps S610 to S630. In step S610, a touch behavior performed on a touch keyboard 3 is detected, and in step S620, the touch behavior is identified to determine whether to output mouse event data, keyboard event data, or a combination of mouse event data and keyboard event data. Next, the mouse event data, the keyboard event data, or the combination of the mouse event data and the keyboard event data are generated according to the identified touch behavior, and the mouse event data, the keyboard event data, or the combination of the mouse event data generated is then output to the operating system 40 of the electronic computer 4. Since related operations are described in the foregoing embodiments, only details regarding identification of different touch behaviors in step S620 are outlined herein.

Figure 7:
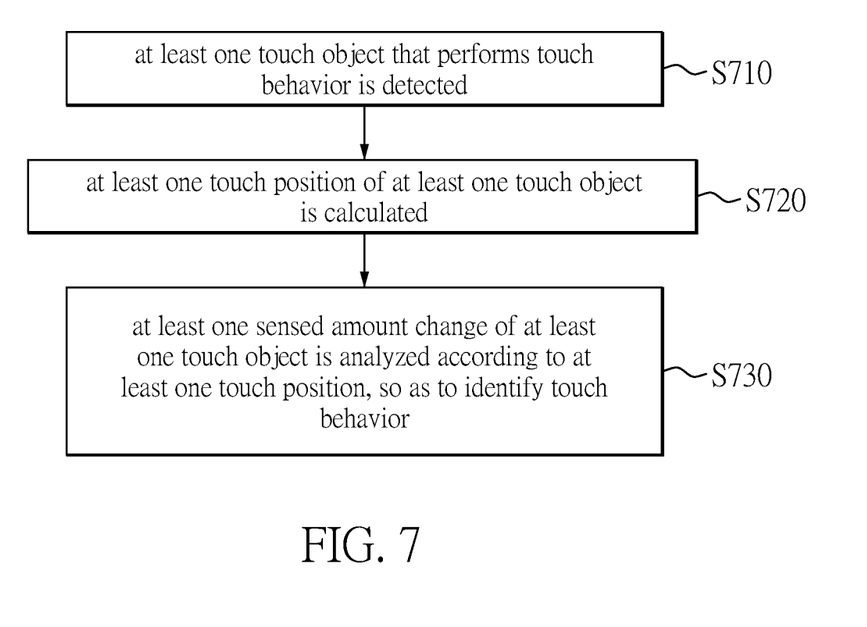
FIG. 7 is a flowchart of identifying a touch behavior according to a first embodiment of the present disclosure.

Reference is made to FIG. 7, which is a flowchart of identifying a touch behavior according to a first embodiment of the present disclosure. In FIG. 7, the step of identifying the touch behavior can include steps S710 to S730. In step S710, at least one touch object that performs the touch behavior is detected, and in step S720, at least one touch position of the at least one touch object is calculated. Next, in step S730, at least one sensed amount change of the at least one touch object is analyzed according to the at least one touch position, so as to identify the touch behavior.

Figure 8:
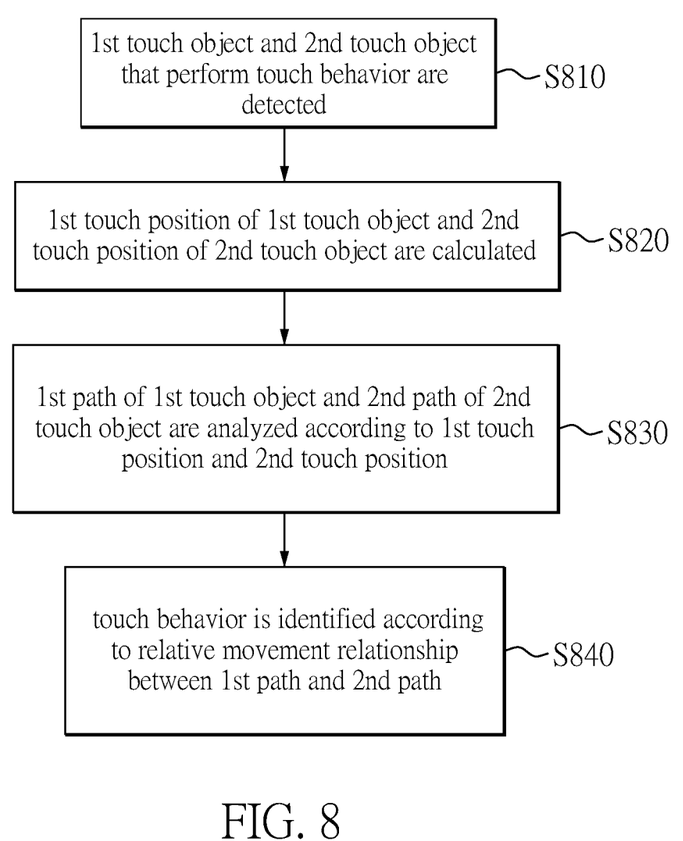
FIG. 8 is a flowchart of identifying a touch behavior according to a second embodiment of the present disclosure.

In addition, reference is made to FIG. 8, FIG. 8 is a flowchart of identifying a touch behavior according to a second embodiment of the present disclosure. In FIG. 8, taking the touch behavior of pinching in or stretching out two fingers for zooming out or in as an example, the step of identifying the touch behavior can include steps S810 to S840. In step S810, a first touch object and a second touch object that perform the touch behavior are detected, that is, the first finger and the second finger, are detected, and in step S820, a first touch position of the first touch object and a second touch position of the second touch object are calculated.

Next, in step S830, a first path of the first touch object and a second path of the second touch object are analyzed according to the first touch position and the second touch position, and in step S840, the touch behavior is identified according to a relative movement relationship between the first path and the second path.

For example, if the relative movement relationship between the first path and the second path is that the first and second touch objects approach each other, the touch behavior can be identified as pinching in two fingers for zooming out; that is, the gesture is detected as placing down and pinching in two fingers. Otherwise, if the relative movement relationship between the first track and the second track is that the first and second touch objects are moved away from each other, the gesture detection module 2033 can identify the touch behavior as two fingers moving apart for zooming in; that is, the gesture is detected as placing down and stretching out two fingers.

Figure 9:
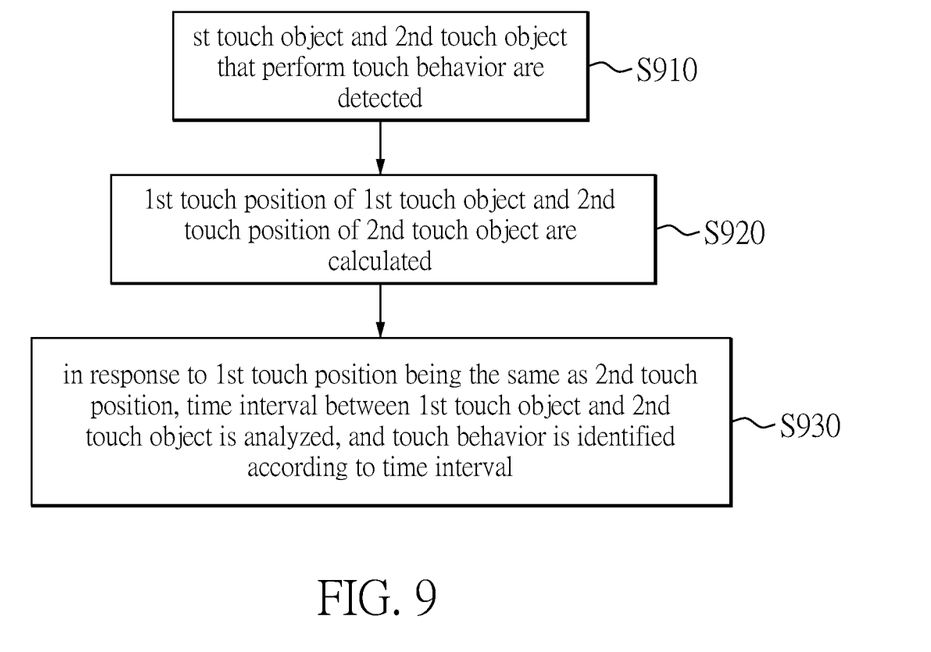
FIG. 9 is a flowchart of identifying a touch behavior according to a third embodiment of the present disclosure.

In addition, referring to FIG. 9, FIG. 9 is a flowchart of identifying a touch behavior according to a third embodiment of the present disclosure. In FIG. 9, taking the touch behavior of double tapping one finger to execute an item as an example, the step of identifying the touch behavior can include steps S910 to S930. In step S910, a first touch object and a second touch object that perform the touch behavior are detected. At this time, the first touch object and the second touch object can be the same finger, but the present disclosure is not limited thereto. In step S920, a first touch position of the first touch object and a second touch position of the second touch object are calculated.

Next, in step S930, in response to the first touch position being the same as the second touch position, a time interval between the first touch object and the second touch object is analyzed, and the touch behavior is identified according to the time interval. For example, if the time interval is less than a predetermined time interval, the touch behavior is identified as double tapping one finger for executing an item; that is, the gesture is detected as double tapping one finger.

It can be seen that the touch keyboard using the input method of the present disclosure can directly identify the touch behavior, and does not need to send the absolute coordinates of the touch object to the operating system 40 of next stage to detect gestures, that is, a detection process of a gesture is under completely control, thereby effectively filtering the user's accidental touch actions when using the touch keyboard. Moreover, the operating system 40 of the electronic computer 4 can also perform the action corresponding to the gesture more quickly after receiving the mouse event data, the keyboard event data or the combination of the mouse event data and the keyboard event data mentioned above.

In addition, the mouse event data generated by a mouse movement utilizes relative coordinates. Therefore, taking controlling a cursor to move by sliding a finger on a surface of the keyboard as an example, the touch keyboard in this embodiment can also choose to output corresponding mouse event data instead of reverting to outputting the absolute coordinates of the touch object (i.e., finger). In this way, the touch keyboard of this embodiment can directly output the mouse event data, the keyboard event data, or the combination of the mouse event data and the keyboard event data without switching between the touch panel mode and the keyboard mode.

In conclusion, in the input method and the controller of the touch keyboard of the present disclosure, the touch behavior can be directly identified without sending the absolute coordinates of the touch object to the operating system 40 of next stage to detect gestures; that is, a detection process of a gesture can be under completely control, thereby effectively filtering the any accidental touching actions when using the touch keyboard. In addition, the touch keyboard can optionally output the mouse event data, the keyboard event data, or the combination of the mouse event data and the keyboard event data, so that there is essentially no need for the touch keyboard to be switched between the touch panel mode and the keyboard mode.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An input method for a touch keyboard, comprising:
    configuring a detection circuit to detect a touch behavior of one or more touch objects performed on the touch keyboard;
    configuring a control circuit to identify the touch behavior and determine whether the touch behavior corresponds to an action that is simultaneously implemented by a keyboard event and a mouse event; and
    configuring the control circuit, in response to determining that the touch behavior corresponds to the action implemented by the keyboard event and the mouse event, to output a combination of mouse event data of the mouse event and keyboard event data of the keyboard event,
    wherein the mouse event includes one or more of scrolling a mouse wheel, clicking a left mouse button and clicking a right mouse button, the mouse event data includes data of the one or more of scrolling the mouse wheel, clicking the left mouse button and clicking the right mouse button, the keyboard event includes pressing one or more of a plurality of keys of a keyboard, and the keyboard event data includes data of pressing the one or more key of the keyboard.

2. The input method according to claim 1, wherein the step of identifying the touch behavior includes:
    detecting the one or more touch objects that performs the touch behavior, and calculating at least one touch position of the one or more touch objects; and
    analyzing, according to the at least one touch position, at least one sensed amount change of the one or more touch objects, so as to identify the touch behavior.

3. The input method according to claim 2, wherein the at least one sensed amount change is at least one touch position change of the one or more touch objects, or a sensed amount change at a single touch position.

4. The input method according to claim 1, wherein the step of identifying the touch behavior includes:
    detecting a first touch object and a second touch object that perform the touch behavior, and calculating a first touch position of the first touch object and a second touch position of the second touch object;
    analyzing a first path of the first touch object and a second path of the second touch object according to the first touch position and the second touch position; and
    identifying the touch behavior according to a relative movement relationship between the first path and the second path.

5. The input method according to claim 1, wherein the step of identifying the touch behavior includes:
    detecting a first touch object and a second touch object that perform the touch behavior, and calculating a first touch position of the first touch object and a second touch position of the second touch object; and
    in response to the first touch position being the same as the second touch position, analyzing a time interval between the first touch object and the second touch object, and identifying the touch behavior according to the time interval.

6. The input method according to claim 1, further comprising:
    generating, according to the identified touch behavior, the combination of the mouse event data and the keyboard event data, which is then output to an operating system of a computer.

7. A controller of a touch keyboard, comprising:
    a detection circuit configured to detect a touch behavior of one or more touch objects performed on the touch keyboard; and
    a control circuit configured to identify the touch behavior and determine whether the touch behavior corresponds to an action that is simultaneously implemented by a keyboard event and a mouse event
    so as to determine whether to output a combination of mouse event data and keyboard event data,
    wherein the mouse event includes one or more of scrolling a mouse wheel, clicking a left mouse button and clicking a right mouse button, the mouse event data includes data of the one or more of scrolling the mouse wheel, clicking the left mouse button and clicking the right mouse button, the keyboard event includes pressing one or more of a plurality of keys of a keyboard, and the keyboard event data includes data of pressing the one or more key of the keyboard.

8. The controller according to claim 7, wherein the control circuit is configured to detect the one or more touch objects that performs the touch behavior, and calculate at least one touch position of the one or more touch objects; and
    wherein the control circuit is further configured to analyze, according to the at least one touch position, at least one sensed amount change of the one or more touch objects, so as to identify the touch behavior.

9. The controller of claim 8, wherein the at least one sensed amount change is at least one touch position change of the one or more touch objects, or a sensed amount change at a single touch position.

10. The controller according to claim 7, wherein the control circuit is configured to detect a first touch object and a second touch object that perform the touch behavior, and calculate a first touch position of the first touch object and a second touch position of the second touch object; and
    wherein the control circuit is further configured to analyze a first path of the first touch object and a second path of the second touch object according to the first touch position and the second touch position, and to identify the touch behavior according to a relative movement relationship between the first path and the second path.

11. The controller according to claim 7, wherein the control circuit is configured to detect a first touch object and a second touch object that perform the touch behavior, and calculate a first touch position of the first touch object and a second touch position of the second touch object; and
    wherein the control circuit is further configured to analyze, in response to the first touch position being the same as the second touch position, a time interval between the first touch object and the second touch object, and identifying the touch behavior according to the time interval.

12. The controller according to claim 7, wherein the control circuit is configured to generate, according to the identified touch behavior, the combination of the mouse event data and the keyboard event data, which is then output to an operating system of an electronic computer.

\* \* \* \* \*